United States Patent [19]
Williams

[11] Patent Number: 6,062,974
[45] Date of Patent: May 16, 2000

[54] PORTABLE GAME ANIMAL SUPPORT

[76] Inventor: Roger Dale Williams, Rte. 16, Box 15 Country La., Dothan, Ala. 36301

[21] Appl. No.: 08/456,349

[22] Filed: Jun. 1, 1995

Related U.S. Application Data

[63] Continuation of application No. 08/361,845, Dec. 21, 1994, abandoned, which is a continuation of application No. 08/176,527, Jan. 3, 1994, abandoned.

[51] Int. Cl.[7] .................................................. A22B 5/06
[52] U.S. Cl. .......................................... 452/187; 452/192
[58] Field of Search .................................. 452/187, 189, 452/192

[56] References Cited

U.S. PATENT DOCUMENTS

| | | | |
|---|---|---|---|
| 957,344 | 5/1910 | Kaiserlik | 452/189 |
| 1,530,675 | 3/1925 | Janes | 452/192 |
| 2,548,038 | 4/1951 | Moliskey | 212/8 |
| 2,630,334 | 3/1953 | Ewers | 280/288.4 |
| 2,808,676 | 10/1957 | Major | 483/23 |
| 2,842,300 | 7/1958 | Johnson | 182/133 |
| 3,354,573 | 11/1967 | Johansson | 483/21.2 |
| 3,553,767 | 1/1971 | Herzog | 452/128 |
| 3,599,277 | 8/1971 | Brown | 452/128 |
| 3,623,187 | 11/1971 | Grubbs | 452/128 |
| 3,727,723 | 4/1973 | Pitcairn et al. | 182/133 |
| 3,854,168 | 12/1974 | Bradley | 452/189 |
| 3,894,313 | 7/1975 | Miller | 452/189 |
| 4,027,357 | 6/1977 | Morris | 452/192 |
| 4,338,703 | 7/1982 | Tanner | 452/187 |
| 4,407,391 | 10/1983 | Greenway et al. | 182/9 |
| 4,506,411 | 3/1985 | Ivy | 452/195 |
| 4,595,078 | 6/1986 | Greenway | 182/9 |
| 4,705,179 | 11/1987 | Lathrum | 212/182 |
| 4,806,063 | 2/1989 | York | 452/187 |
| 4,903,372 | 2/1990 | Jones | 452/187 |
| 4,977,643 | 12/1990 | Prysock | 452/187 |
| 5,049,110 | 9/1991 | Owens | 452/187 |
| 5,236,386 | 8/1993 | Dingee | 452/192 |

OTHER PUBLICATIONS

"1992 Fall Mid–Season", catalog published by Gander Mountain, Inc., 1992, pp. 95–99.

*Primary Examiner*—Willis Little
*Attorney, Agent, or Firm*—Fish & Neave; Robert W. Morris

[57] ABSTRACT

A portable, foldable structure for the dressing of game animals in the field is provided. The present invention is a portable game support which has an upper arm with a game attachment means suspended at one end of the upper arm and a flange support attached at the terminus of the other end of the upper arm with means for attachment to a tree trunk or like vertical columnar member. The portable game animal support has a lower arm having means at one end for attachment to the tree or like vertical columnar member with the lower arm being coupled at the other end to the upper arm to provide additional strength to the portable game animal support.

20 Claims, 10 Drawing Sheets

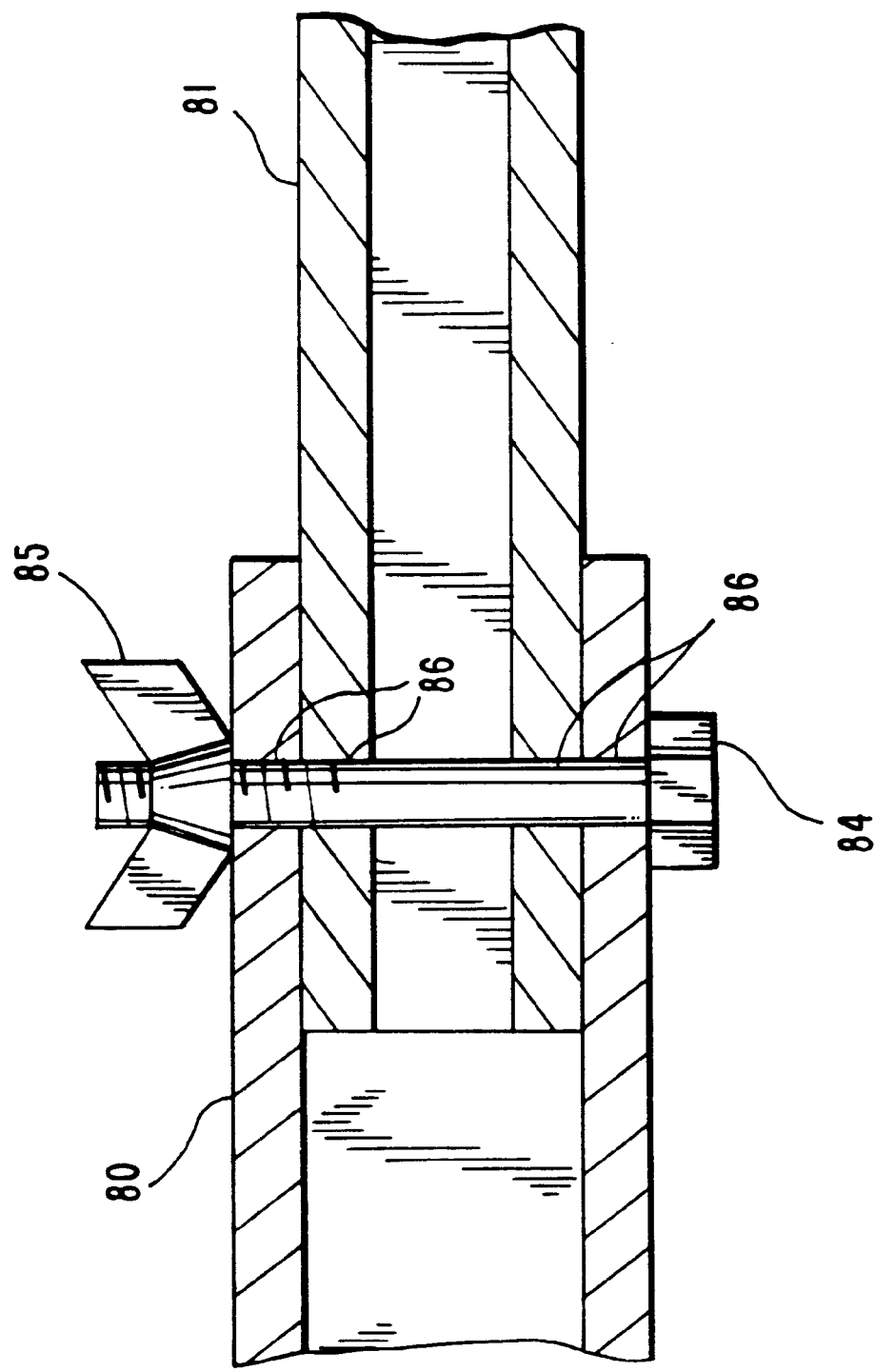

PORTABLE GAME ANIMAL SUPPORT

CROSS REFERENCE TO RELATED APPLICATIONS

This application is a file-wrapper continuation of application Ser. No. 08/361,845, filed Dec. 21, 1994, now abandoned, which was a file-wrapper continuation of application Ser. No. 08/176,527, filed Jan. 3, 1994, now abandoned.

BACKGROUND OF THE INVENTION

The present invention relates to a portable, foldable game animal support used for dressing game animals in the field. It particularly relates to such a device which has an upper arm with a game animal attachment suspended at one end of the upper arm and a flange support at the other end of the upper arm for attachment to a tree trunk, pole, or like vertical columnar member. The portable game animal support has a lower arm with one end for attachment to the tree trunk, pole, or like vertical columnar member and with the other end being connected to the upper arm to provide additional support to the upper arm.

It is often desireable for a hunter to dress a game animal in the field near where the game animal was harvested. For many types of game animals, prompt bleeding, skinning, and gutting results in higher meat quality. Prompt dressing also reduces the chance of meat spoilage. Because game animals are often harvested far from the road, dressing game in the field allows the hunter to avoid having to carry the animal long distances on foot. The dressing of game in the field also allows the hunter to leave behind unwanted portions of the animal, which may represent a substantial part of the total weight of the animal. Also, field dressing also permits the hunter to reduce the game animal to more readily transportable parts. Thus, field dressing of game animals can considerably reduce the difficulty of moving the game animal.

Though field dressing offers many advantages, field dressing can present problems. The gutting and skinning of game animals on the ground in the field exposes the meat to contamination by soil and detritus. A game animal on the ground must be manually pushed or rolled into position for dressing.

Ideally, for dressing, the game animal would be suspended above the ground to avoid contamination of the meat and allow easy access to all parts of the game animal. A portable apparatus for suspending and dressing game animals in the field would allow the hunter to carry the apparatus into the field and conduct prompt and convenient dressing, even in remote areas.

U.S. Pat. Nos. 1,530,675; 4,027,357; and 5,236,386 are examples of folding game animal suspension devices. The patents relate to devices having two arms with hooks or the like on their ends for engaging the game animal, with the arms being attached to a central piece. The central piece is suspended from an overhanging tree limb or a similar support. Overhanging limbs of a height and strength suitable for the suspension of game can sometimes be difficult to find.

U.S. Pat. No. 3,894,313 to Miller relates to an inverted U-shaped frame of tubular construction with the game animal suspended between the legs of the U-shaped frame. The frame is supported by a cord running from the ground to an eyelet at the top of the inverted U-shaped frame. Such a frame requires legs each at least the length of the suspended game animal, and a cross piece wide enough to allow the hunter access to the game animal. One significant disadvantage of such a frame is the increased weight of such a large structure.

U.S. Pat. No. 3,854,168 to Bradley and U.S. Pat. No. 4,903,372 to Jones relate to pole supports for suspending game animals for dressing. Jones relates to a pole support attached to the trailer hitch of a pick-up truck. The pole in Jones has an angled upper end from which the game animal is suspended. One problem with Jones is that it does not offer the advantages of immediate dressing of game animals in the field near where the game animals were harvested because it requires attachment to a vehicle. Although Bradley can be attached to a tree as well as the bumper of a pick-up truck, it lacks a lower support arm for the additional support large game animals may require.

U.S. Pat. No. 4,338,703 to Tanner relates to a support which fits into slots in the sidewalls of pick-up trucks. One problem with Tanner is that it is not portable and does not offer the advantages of dressing game animals in the field near where the game animal was harvested.

U.S. Pat. No. 5,049,110 to Owens refers to a support frame with two legs that pass around the trunk of a tree, a connector bar joining the legs and contacting the front of the tree trunk, a V-shaped rear retainer bar passing around the back of the tree, and a support arm extending from the front of the frame to the tree trunk. In Owens, the game animal is attached to an engaging frame hung from the front of the support frame. One significant disadvantage of Owens is that such a frame is rigid, nonfoldable, and bulky, thus reducing the portability of the frame. Also, the Owens frame has many component parts and joints which may increase manufacturing costs.

In view of the foregoing, it is an object of the present invention to provide a portable game animal support that can be carried into the field.

It is an additional object of the present invention to provide a portable game animal support that can be attached to poles or the trunks of most trees.

It is also an object of the present invention to provide a portable game animal support that can be used to dress medium and large game.

It is a further object of the present invention to provide a portable game animal support that is lightweight, sturdy, durable, and reliable.

SUMMARY OF THE INVENTION

These and other objects of the invention are accomplished in accordance with the principles of the invention by providing a portable game anumal support that has an upper arm with a game animal attachment means suspended at one end of the upper arm and a flange support attached at the terminus of the other end of the upper arm with means for attachment to a tree trunk, pole, or like vertical columnar member. The apparatus has a lower arm having means at one end for attachment to the tree trunk, pole, or like vertical columnar member with the lower arm being coupled at the other end to the upper arm.

The present invention is easily portable being both lightweight and foldable. In its folded form the device is a compact collinear arrangement of the support arms.

The apparatus set forth here allows the hunter to suspend the game animal above the ground and permits convenient access to all parts of the animal and requires only a tree trunk, pole, or like vertical columnar member for full function.

Moreover, the apparatus has great strength and durability. Some game animals, such as elk, moose, or large deer can be quite heavy and require a particularly strong support. The apparatus set forth here provides a lower support arm enabling it to handle heavy loads.

Also, the simple design lends itself to easy fabrication and low costs of manufacture.

An alternate embodiment of the present invention can be used in conjunction with the slots commonly found in the sidewalls of pick-up truck beds, allowing the hunter to dress game animals in areas with few trees.

BRIEF DESCRIPTION OF THE DRAWINGS

The above and other objects and advantages of this invention will be apparent upon consideration of the following detailed description, taken in conjunction with the accompanying drawings, in which like reference numbers refer to like parts throughout and in which:

FIG. 10 shows a top plan view in partial section of the telescoping arms shown in FIG. 8, taken from line 10—10.

DESCRIPTION OF THE PREFERRED EMBODIMENT

Figure 1:
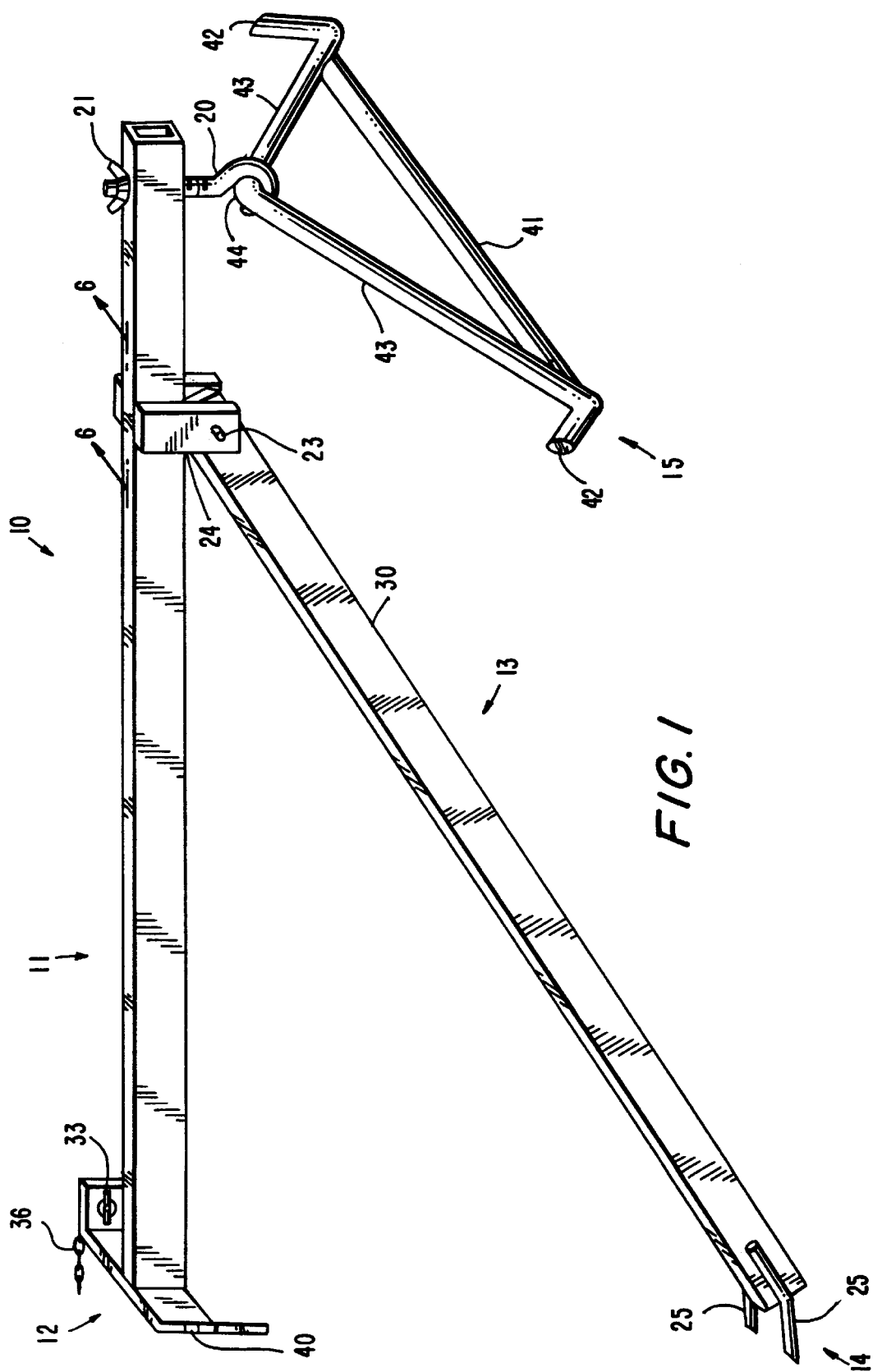
FIG. 1 is a perspective view of the portable game animal support of the present invention.

A preferred embodiment of the game dressing support, generally designated 10, is shown in FIGS. 1–6. The portable, foldable game dressing support includes an upper arm 11 with a flange support 12 typically welded at the terminus of one end, a game animal attachment 15 suspended from a hook 20 at the other end, and a lower arm 13 attached to the upper arm 11 by pivot attachment 23, the pivot being held in place in any conventional manner such as by two sideplates 24 welded to either side of the upper arm 11. The arms, which are typically composed of rectangular section metal tube for lightness and strength, may be painted to protect the metal and reduce the visibility of the portable, foldable game animal support 10.

Referring to FIGS. 1–5, the flange support 12, in conjunction with an attached chain 36, provides the primary means for securing the upper arm 11 to a tree 52, pole 55 (which may be mounted in pick-up truck wall 54 via opening 53), or any similar vertical columnar member. The chain 36, which is fixedly attached to one side of the flange support 12, passes around the tree 52, pole 55, or similar vertical columnar member and is held in place on the other side of the flange support 12 by a slot 40 cut into the flange support 12, thereby holding the flange support 12 tightly against the vertical columnar member. Slot 40 is sufficiently narrow that a chain link may only pass through the slot when aligned vertically. Thus a link 46, joined to a link 47, lying in the slot 40 blocks movement of the chain 36. Other methods of securing the arm to the tree, pole, or any similar vertical columnar member may be used without departing from the spirit of the invention. For example, an adjustable fabric belt may be used in place of the chain 36, the belt being fixedly attached to the flange support and passing around the tree with the ends of the belt held together by a buckle.

The lower arm 13 may have two spikes 25, to engage the tree 52, pole 55, or similar vertical columnar member. The spikes 25 are formed from cylindrical metal pieces cut at an angle to form sharp ends. These spikes may be welded onto either side of an end 14 of the lower arm tube 13. Other methods of engaging the lower arm to the vertical columnar member may also be used without departing from the spirit of the invention. For example, a single spike may be welded on end 14 of lower arm tube 13.

The hook 20, which is typically threaded, passes through the upper arm 11 and may be held in place by a wing nut 21. Other methods of attaching the hook 20 to upper arm 11 may also be used without departing from the spirit of the invention. For example, the hook 20 may be welded in place. The hook 20 engages the bend 44 in the top of the game attachment 15.

Game animal attachment 15, commonly referred to by hunters as a gambrel, has hooks 42 on either end that are intended to pass through the legs of a game animal 16, holding the game animal in place and thus suspending the game animal 16 from the portable, foldable game animal support 10. A bar 41, typically welded to a pair of arms 43 of the game animal attachment 15, further adds strength to the portable game animal support.

Figure 2:
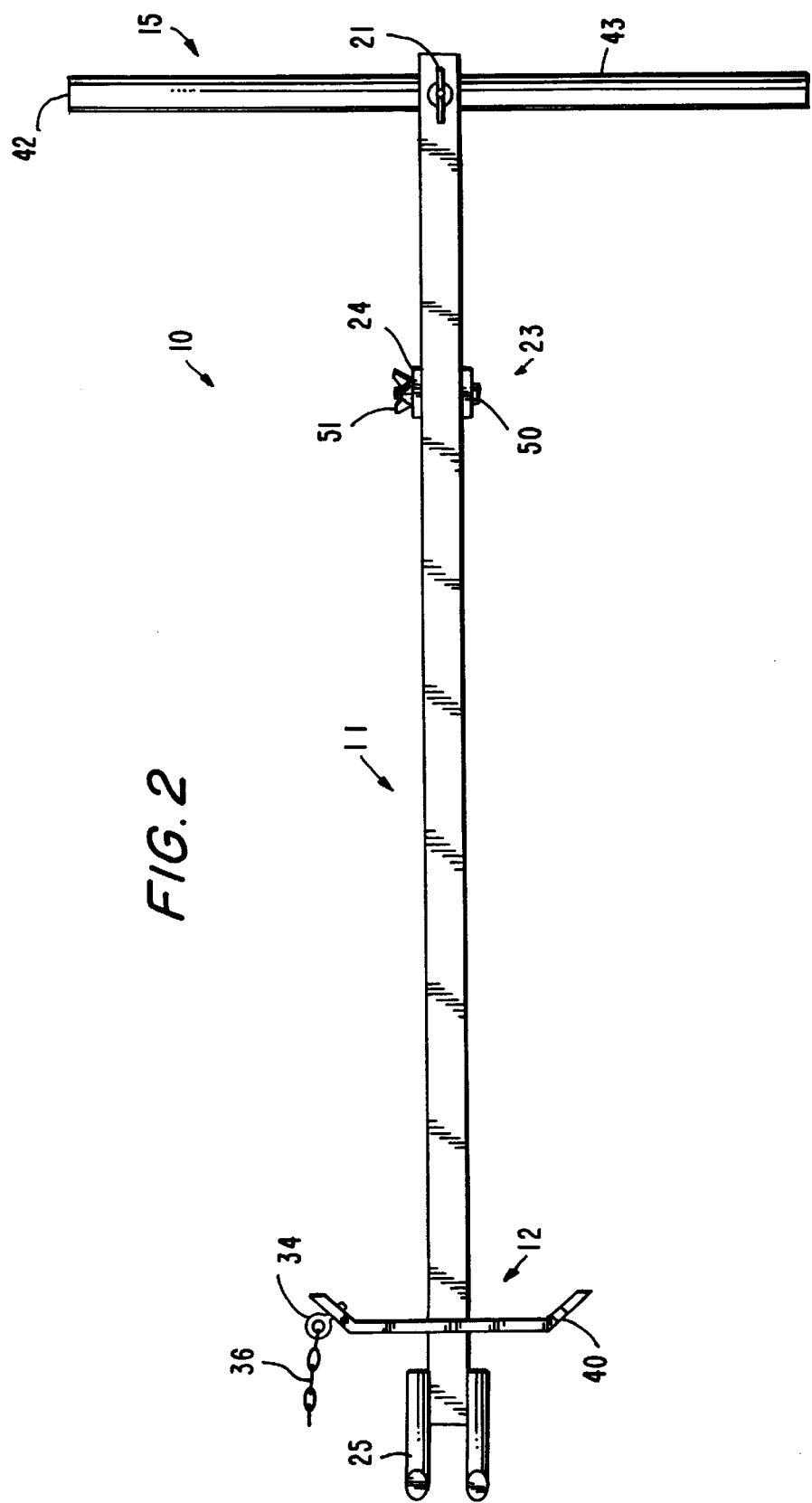
FIG. 2 shows a top plan view of the portable game animal support of FIG. 1 of the present invention.
Figure 3:
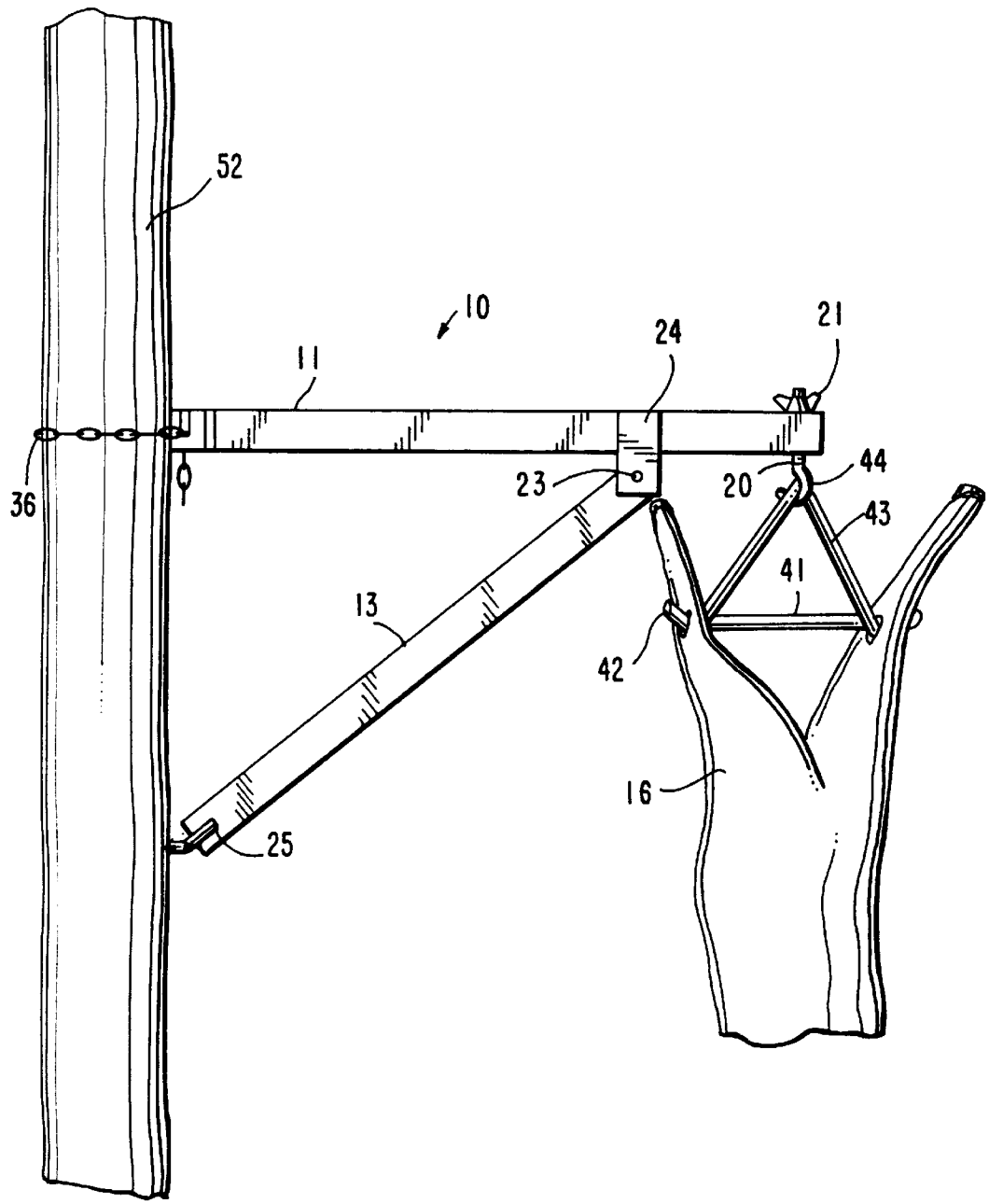
FIG. 3 shows the portable game animal support of FIG. 1 of the present invention mounted on a tree trunk.
Figure 4:
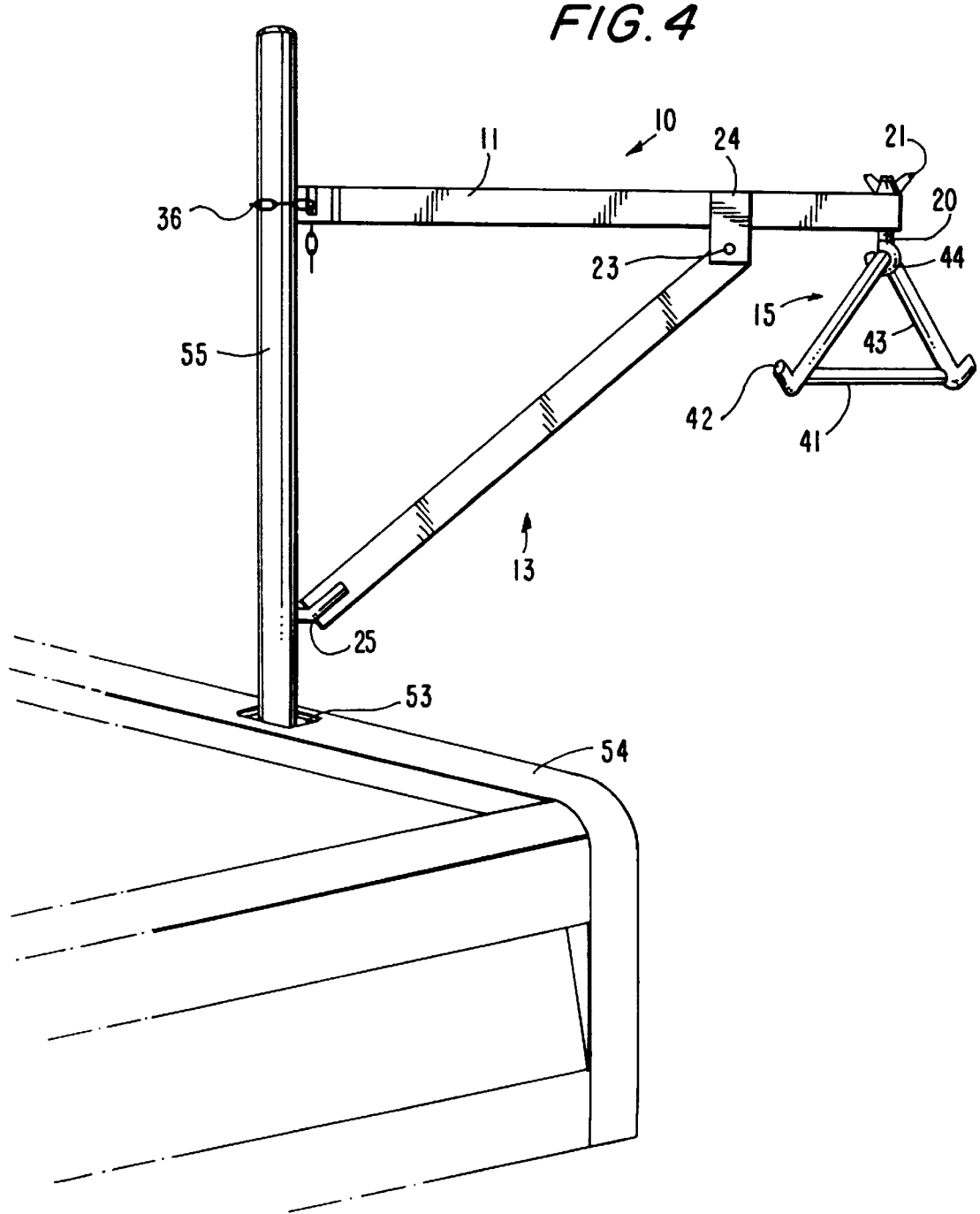
FIG. 4 shows a device embodying the portable game animal support of FIG. 1 of the present invention mounted on the sidewall of a pick-up truck.
Figure 5:
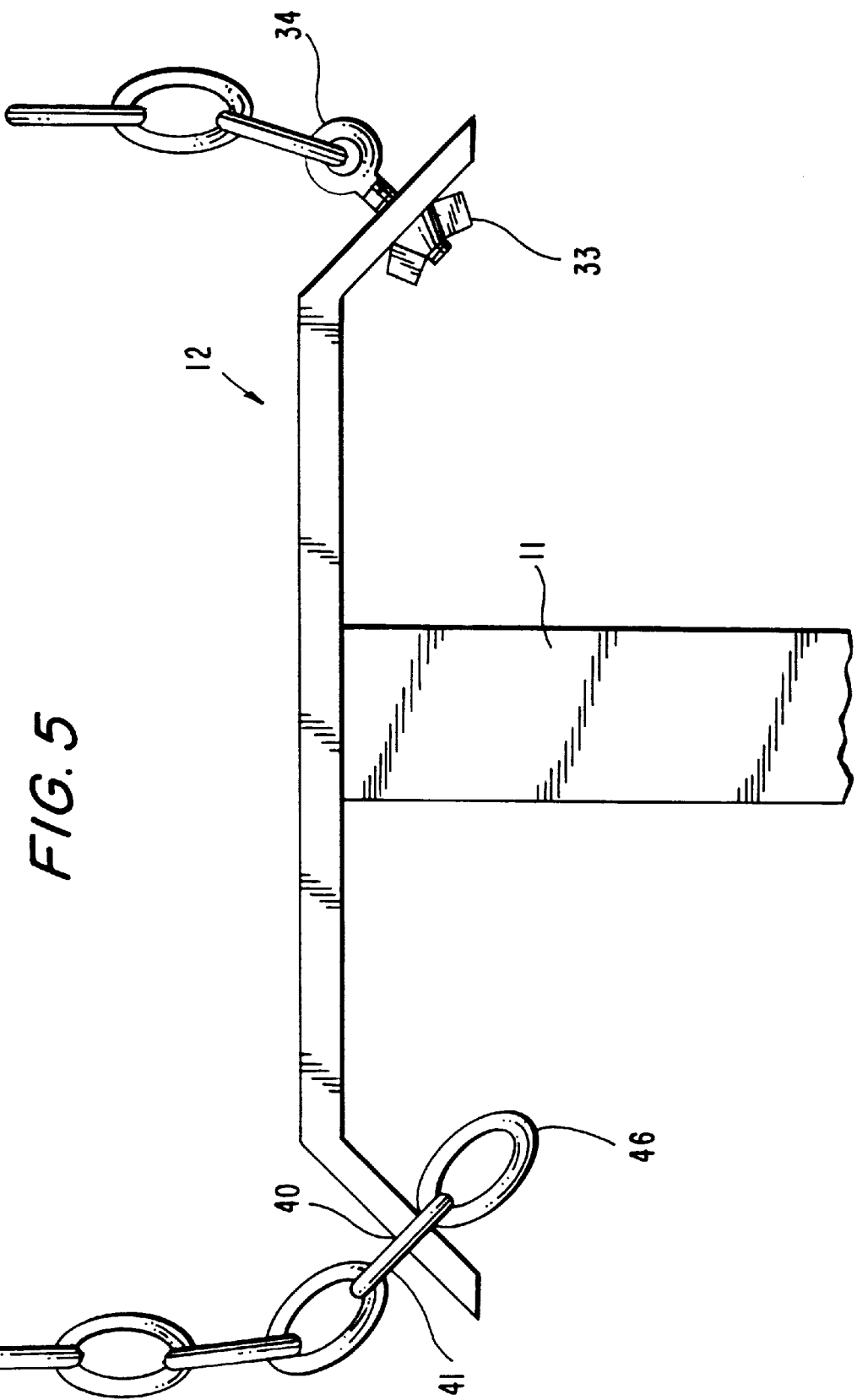
FIG. 5 shows a top detailed plan view of the tree engagement component of the upper arm of the portable game animal support of the present invention.
Figure 6:
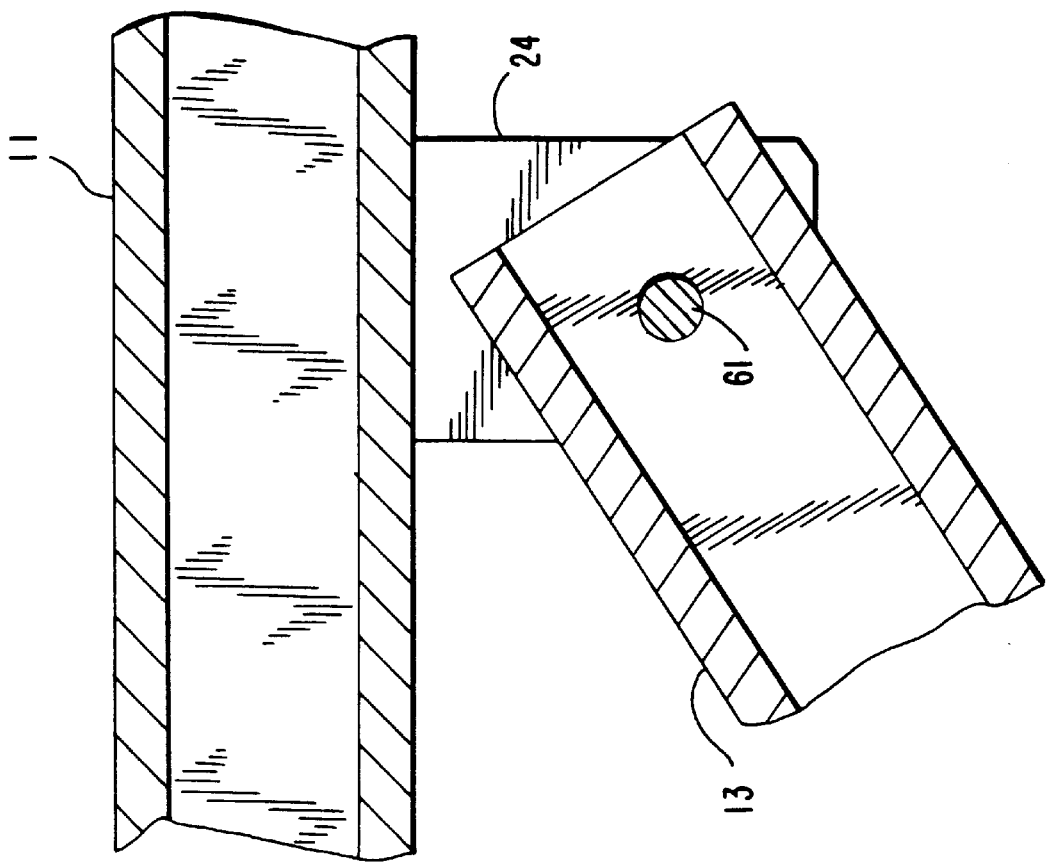
FIG. 6 shows a side elevational view and partial section of the pivot attachment of the upper and lower arm shown in FIG. 1, taken from line 6—6.

FIGS. 2 and 6 show the pivot attachment 23 joining the upper arm 11 to the lower arm 13. The lower arm 13 fits between the two sideplates 24. A bolt 50 passes through holes 61 in the sideplates 24 and through corresponding holes drilled in the lower arm 13. The bolt 50 may be held in place by a wingnut 51. The lower arm 13 can thus rotate between the two sideplates 24 about the bolt 50 so that the lower arm 13 can be aligned collinearly with upper arm 11.

Figure 7:
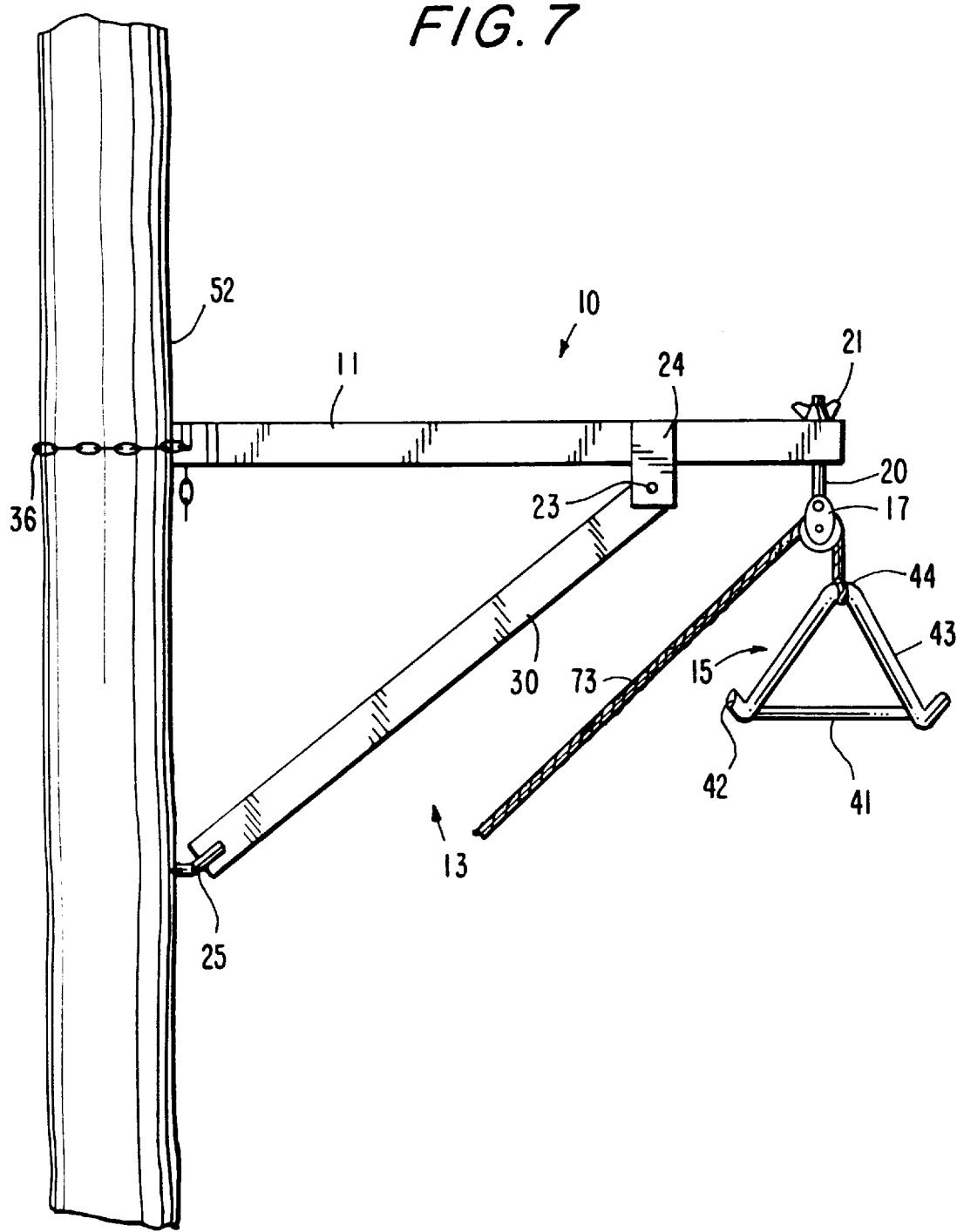
FIG. 7 shows an alternate embodiment of the present invention in which a pulley is attached and the portable game animal support is mounted on a tree trunk.
Figure 9:
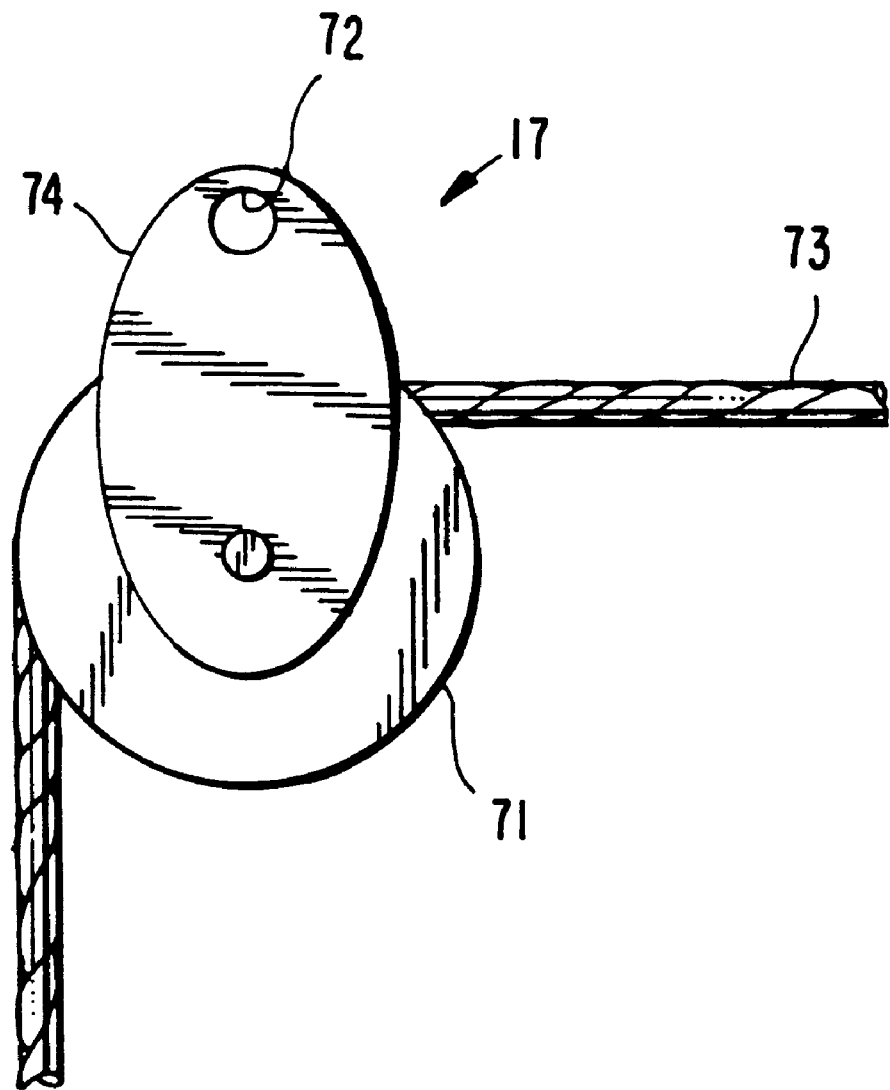
FIG. 9 shows a side view of the pulley assembly illustrated in FIG. 7.

Referring to FIGS. 7 and 9, an alternate preferred embodiment of the portable game animal support having a pulley assembly 17 is described. The pulley assembly 17 may be suspended from hook 20. The unthreaded end of hook 20 passes through hole 72 of the pulley assembly 17. A pulley rope 73 passes through pulley assembly 17, with one end of the pulley rope being fastened to the game animal attachment 15 at bend 44 of the top of the game animal attachment 15. The game animal attachment 15 has hooks 42 which pass through the legs of the game animal 16. The game animal can thus be raised and lowered by pulling on pulley rope 73, substantially easing the task of raising and lowering the game animal for dressing.

Figure 8:
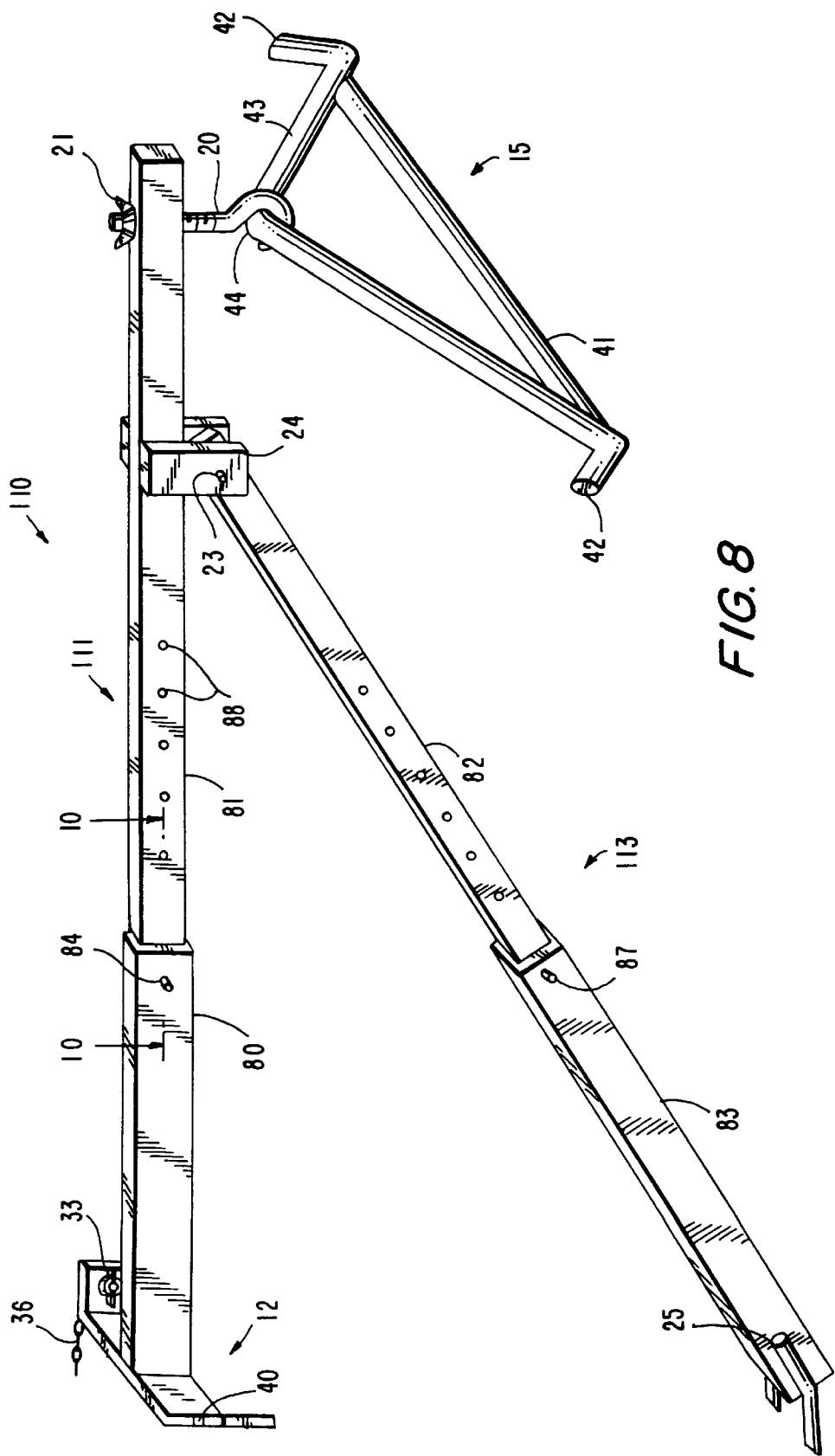
FIG. 8 is a perspective view of another alternate embodiment of the present invention having telescoping arms.

FIGS. 8 and 10 show another alternate preferred embodiment of the invention, portable game animal support 110. In portable game animal support 110, the upper arm tube 111 is formed of two segments 80 and 81. Segment 81 fits into segment 80 and can slide within segment 80 (or vice versa). When fully extended, segment 81 is typically held in place by a bolt 84 which passes through holes 86 in segments 80 and 81. Segment 80 is held in an intermediate or closed position typically by bolt 84 which passes through holes 86 in segment 80 and holes 88 in segment 81. A wingnut 85 secures bolt 84 in place. In this preferred embodiment, the lower arm 113 may also be composed of two segments 83 and 82, with segment 82 able to slide inside segment 83 (or vice versa). When fully extended, segments 82 and 83 are held in place by bolt 87 in the same manner as segments 80 and 81 are held by bolt 84. Segments 82 and 83 can be held in an intermediate or closed position in the same manner as segments 80 and 81 are held in an intermediate or closed position by bolt 84. The sliding arrangement allows the upper arm 111 and lower arm 113 to telescope reducing overall length of the portable game animal support for even easier transport.

It will be understood that the foregoing is only illustrative of the principles of the invention, and that various modifications may be made by those skilled in the art without departing from the scope and spirit of the invention. For example, the arms of the game support could be manufactured from a high-strength composite material to further reduce the weight and increase the portability of the device.

I claim:

1. A portable, foldable structure for the dressing of game animals in the field, the structure being in one of OPENED and CLOSED positions, the structure comprising:

an upper arm having distal and proximal ends;

game animal attachment means suspended at about the distal end of the upper arm;

a flange support fixedly attached at the proximal end of the upper arm and having means for attachment to a tree or like vertical columnar member, such that the upper arm extends radially from the tree or like columnar member; and a lower arm having distal and proximal ends and means at the Proximal end for attachment to the tree or like vertical columnar member and being pivotally connected at the distal end to the upper arm, the upper and lower arms being substantially aligned in a plane which extends radially from the tree or like columnar members, such that in the CLOSED position, the upper and lower arms are collinear.

2. The structure of claim 1, wherein the upper arm is formed of telescoping members.

3. The structure of claim 1, wherein the lower arm is formed of telescoping members.

4. The structure of claim 1, wherein the upper arm and the lower arm are formed of telescoping members.

5. The structure of claim 1, wherein pulley means is interposed between the distal end of the upper arm and the game animal attachment means, the pulley means being removably attached to the upper arm and the game animal attachment means and being adapted to raise and lower the game animal attachment means.

6. The structure of claim 2, wherein pulley means is interposed between the distal end of the upper arm and the game animal attachment means, the pulley means being removably attached to the upper arm and the game animal attachment means and being adapted to raise and lower the game animal attachment means.

7. The structure of claim 3, wherein pulley means is interposed between the distal end of the upper arm and the game animal attachment means, the pulley means being removably attached to the upper arm and the game animal attachment means and being adapted to raise and lower the game animal attachment means.

8. The structure of claim 4, wherein pulley means is interposed between the distal end of the upper arm and the game animal attachment means, the pulley means being removably attached to the upper arm and the game animal attachment means. and being adapted to raise and lower the game animal attachment means.

9. A portable, foldable structure for the dressing of game animals in the field, the structure being in one of OPENED and CLOSED positions, the structure comprising:

an upper arm having distal and proximal ends;

a gambrel for the attachment of game animals with hooks at either end suspended at about the distal end of the upper arm;

a flange support fixedly attached at the proximal end of the upper arm for attaching the portable game animal structure to a tree or like vertical columnar member, such that the upper arm extends radially from the tree or like columnar member, the flange support having first and second ends;

a lower arm having distal and proximal ends and at least one spike at the proximal end for attachment to the tree or like vertical columnar member and being pivotally connected at the distal end to the upper arm, the upper and lower arms being substantially aligned in a plane which extends radially from the tree or like columnar member, such that in the CLOSED position, the upper and lower arms are collinear.

10. The structure of claim 9, wherein the flange support comprises a chain fixedly attached at the first end of the flange support and removably attached to the second end.

11. The structure of claim 9, wherein the flange support comprises a belt fixedly attached at the first end of the flange support and removably attached to the second end.

12. The structure of claim 9, wherein the flange support comprises a rope fixedly attached to the first end of the flange support and removably attached to the second end.

13. The structure of claim 9, wherein the upper arm is formed of telescoping members.

14. The structure of claim 9, wherein the lower arm is formed of telescoping members.

15. The structure of claim 9, wherein the upper arm and the lower arm are formed of telescoping members.

16. The structure of claim 9, wherein a pulley is interposed between the distal end of the upper arm and the gambrel, the pulley being removably attached to the upper arm and the gambrel; and a rope passes through the pulley and is removably attached at one end to the gambrel to raise and lower the gambrel.

17. The structure of claim 13, wherein a pulley is interposed between the distal end of the upper arm and the gambrel, the pulley being removably attached to the upper arm and the gambrel; and a rope passes through the pulley and is removably attached at one end to the gambrel to raise and lower the gambrel.

18. The structure of claim 14, wherein a pulley is interposed between the distal end of the upper arm and the gambrel, the pulley being removably attached to the upper arm and the gambrel; and a rope passing through the pulley and is removably attached at one end to the gambrel to raise and lower the gambrel.

19. The structure of claim 15, wherein a pulley is interposed between the distal end of the upper arm and the gambrel, the pulley being removably attached to the upper arm and the gambrel; and a rope passing through the pulley and is removably attached at one end to the gambrel to raise and lower the gambrel.

20. A portable, foldable structure for the dressing of game animals in the field comprising:

an upper arm member having distal and proximal ends;

game animal attachment means suspended at about the distal end of the upper arm member;

a lower arm member having distal and proximal ends, the distal end of the lower arm member being pivotally connected to the upper arm member adjacent the distal end of the upper arm member so that the lower arm member can be selectively pivoted between: (1) a CLOSED position in which the upper and lower arms members are collinear such that the proximal ends of the upper and lower arm members are adjacent to one another and the upper and lower arm members overlap one another along at least a majority of their lengths, and (2) an OPEN position in which the lower arm member diverges from the upper arm member so that the upper and lower arm members collectively form a substantially planar structure; and a flange support member fixedly attached to the proximal end of the upper arm member, the flange support member extending substantially perpendicular to the plane of the planar structure on both sides of the plane, the flange support having means for attachment to a tree or like columnar member which thereby releasably secures the portable, foldable structure to the tree or like columnar member with the plane extending radially out from the tree or like columnar member and with the lower arm diverging down from the upper arm so that the proximal end of the lower arm bears on the surface of the tree or like columnar member and thereby supports the upper arm member to extend radially out from the tree or like columnar member.

* * * * *